(12) United States Patent  (10) Patent No.: US 8,038,128 B2
Pontius  (45) Date of Patent: Oct. 18, 2011

(54) EVAPORATIVE HUMIDIFIER PAD MADE OF RIGIDIFYING LAYER LAMINATED TO PAPER LAYER AND METHOD OF CONSTRUCTING

(75) Inventor: Jeffrey Pontius, Amanda, OH (US)

(73) Assignee: Columbus Industries, Inc., Ashville, OH (US)

( * ) Notice: Subject to any disclaimer, the term of this patent is extended or adjusted under 35 U.S.C. 154(b) by 1012 days.

(21) Appl. No.: 11/853,481

(22) Filed: Sep. 11, 2007

(65) Prior Publication Data

US 2009/0065958 A1   Mar. 12, 2009

(51) Int. Cl.
    *B01F 3/04* (2006.01)
(52) U.S. Cl. .......................... 261/99; 261/107
(58) Field of Classification Search .............. 261/97, 261/99, 103, 104, 106, 107
    See application file for complete search history.

(56) References Cited

U.S. PATENT DOCUMENTS

| 5,374,381 A | 12/1994 | Schuld et al. |
| 6,000,684 A * | 12/1999 | Pasch et al. ................. 261/104 |
| 6,110,564 A | 8/2000 | Pontius |
| 6,568,662 B2 * | 5/2003 | Schuld .......................... 261/94 |
| 6,886,814 B1 * | 5/2005 | Schuld .......................... 261/94 |
| 7,309,331 B2 * | 12/2007 | Hanson et al. ............ 604/385.101 |
| 2002/0109245 A1 * | 8/2002 | Schuld .......................... 261/94 |
| 2005/0046050 A1 * | 3/2005 | Palmer et al. ................. 261/97 |
| 2006/0279008 A1 * | 12/2006 | Jursich ........................ 261/104 |

* cited by examiner

*Primary Examiner* — Charles Bushey
(74) *Attorney, Agent, or Firm* — Jason H. Foster; Kremblas & Foster

(57) ABSTRACT

A humidifier pad made of a plurality of laminated sheets connected together in a stack. Each of the sheets is made of a two layer laminate material made of a first layer of a rigidifying material, such as aluminum, and a second layer made of an absorbent layer, such as paper. The layers of each of the sheets are first laminated together, and then each sheet is slit and expanded in a conventional manner. Subsequently, each sheet is bonded to a next adjacent sheet to form a pad.

6 Claims, 3 Drawing Sheets

FIG. 2
FIG. 3
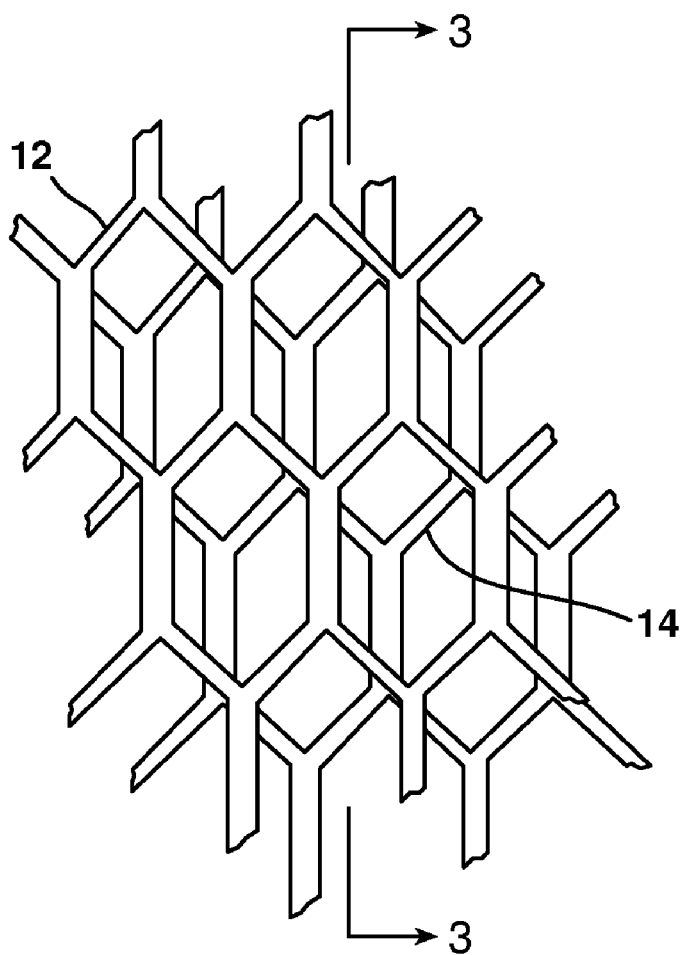
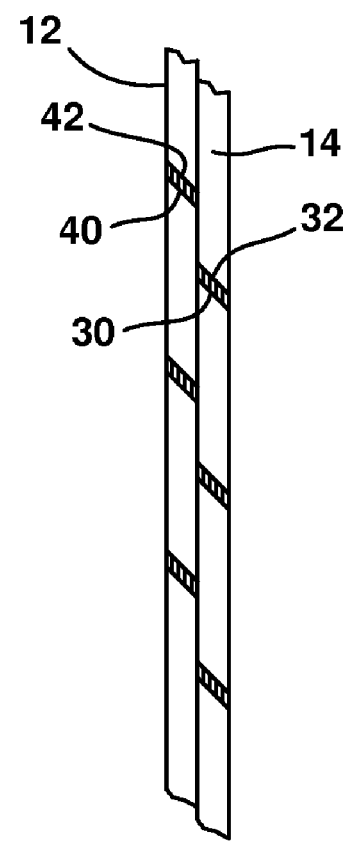

EVAPORATIVE HUMIDIFIER PAD MADE OF RIGIDIFYING LAYER LAMINATED TO PAPER LAYER AND METHOD OF CONSTRUCTING

BACKGROUND OF THE INVENTION

1. Field of the Invention

This invention relates generally to an evaporative humidifier pad for furnace and recirculating type humidifiers, and more particularly to the construction of the pad and the method by which the pad is constructed.

2. Description of the Related Art

Household humidifiers commonly have replaceable evaporative elements that spread water over a surface to promote evaporation of the water into air that is directed over and through the element. It is known that an element should permit air to freely pass through the element, and that the element should have a large surface area for exposure of the water to the air. It is also known to make the evaporative element from materials that will promote capillary or wicking action to absorb and spread the water throughout the evaporative element.

In addition, the evaporative element should be made of materials and with a configuration sufficient to maintain the structural integrity of the evaporative element when it is subjected to use in water, heat and air flow. The prior art contains humidifier elements with reinforcing material placed between paper layers, such as in U.S. Pat. No. 5,374,381 to Schuld et al., which patent is incorporated by reference herein. Additionally, U.S. Pat. No. 6,110,564 to Pontius, which is incorporated herein by reference, discloses a humidifier pad with multiple layers of slit and expanded paper laminated together. At least one of the paper layers comprises substantially nonwicking paper and the remaining layers comprise highly absorbent wicking paper.

Thus, the prior art humidifier pads are made of slit and expanded paper in combination with a reinforcing material, such as aluminum. However, in the prior art pads of this type, the layers are slit and expanded separately and then glued together separately.

The prior art also contains coated, expanded aluminum pads made using a manufacturing process in which aluminum foil is slit and expanded. Next, several layers of expanded aluminum are glued together using adhesives. A coating is then applied to the pad. Once the coating is cured, the pad is cut to the required dimensions.

As a result of this process, a very rigid humidifier pad is constructed. The color of the coating could be light brown, tan or light grey, and it helps to distribute water over a large surface of the humidifier pad to promote evaporation. However, the coating can release chemical compounds causing water discoloration and foaming, both of which are undesirable. Additionally, coated aluminum pads used in these applications are made using a relatively simple, but labor-intensive, manufacturing process. The coating slurry is a mix of several components that must be cured in an oven at high temperature. Very often this coating is also a cause of water discoloration when the pad is used.

Therefore, the need exists for an improved humidifier pad.

BRIEF SUMMARY OF THE INVENTION

An objective of the invention is to replace rigid coated humidifier pads for furnace humidifiers and portable recirculated type humidifiers with a superior and less expensive alternative. The invention contemplates the formation of a humidifier pad made of slit and expanded sheets bonded together with adhesives. The sheets are laminations constructed of a layer of supporting, rigidifying material laminated to an absorbent layer, such as wick paper. The supporting layer provides rigidity and can be made of such materials as aluminum or plastic (polymeric) foil.

The manufacturing process is simplified and the performance and the appearance are improved. The invention achieves the objectives of producing higher output, no water discoloration, lower cost and improved manufacturing process.

BRIEF DESCRIPTION OF THE SEVERAL VIEWS OF THE DRAWINGS

FIG. 2 is a schematic front view illustrating a magnified view of two layers of the preferred embodiment shown in FIG. 1.

FIG. 3 is a schematic side view, through the line 3-3 of FIG. 2, illustrating a magnified view of two layers of the preferred embodiment.

Figure 1:
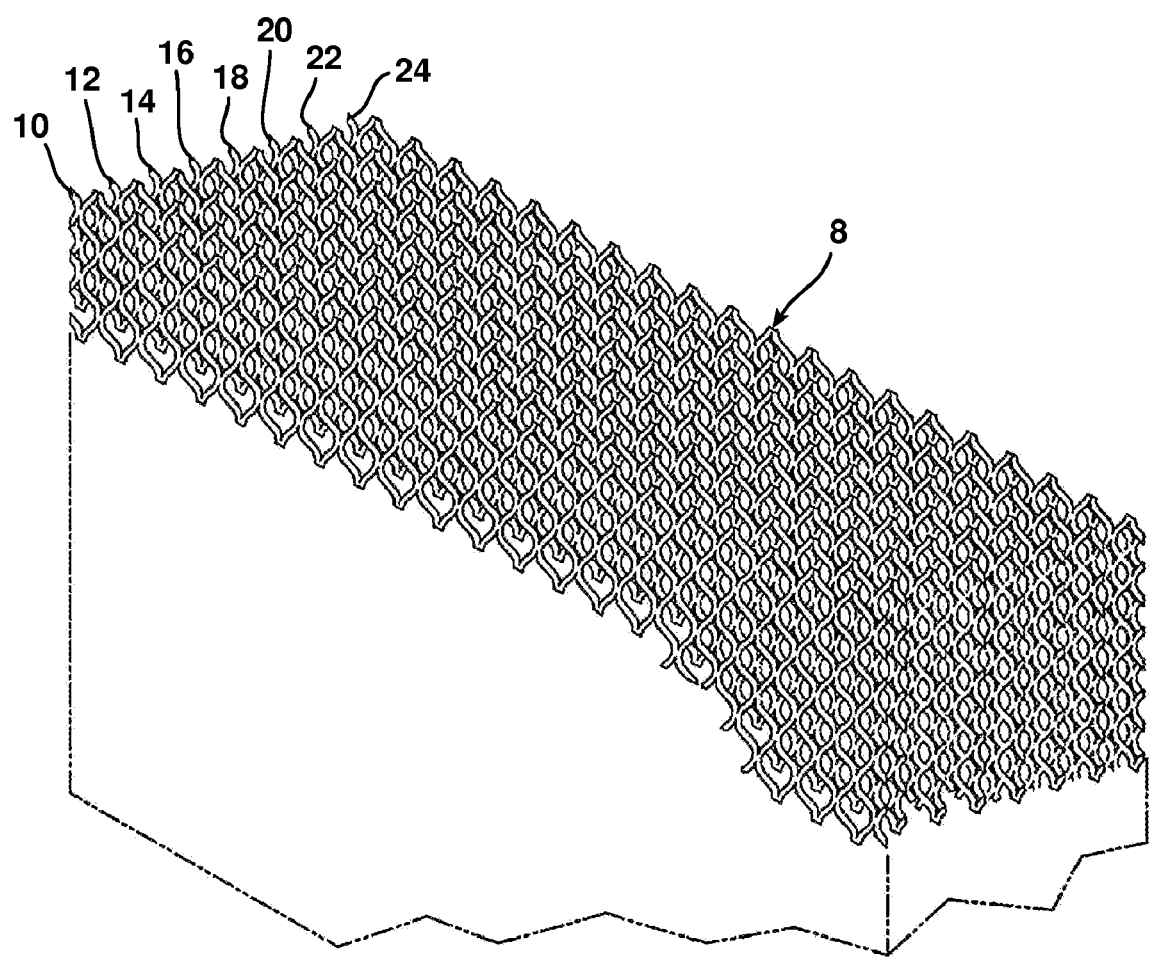
FIG. 1 is a view in perspective illustrating a preferred embodiment of the present invention.

In describing the preferred embodiment of the invention that is illustrated in the drawings, specific terminology will be resorted to for the sake of clarity. However, it is not intended that the invention be limited to the specific term so selected and it is to be understood that each specific term includes all technical equivalents that operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

An embodiment of the present invention is shown in FIG. 1, in which a humidifier pad 8 is made of multiple sheets 10, 12, 14, 16, 18, 22 and 24 of slit and expanded material. The humidifier pad is used in a conventional humidifier in a known manner, as will be apparent from the description herein. The pad 8 can be used in wick-up and flow down types of humidifiers, depending upon the characteristics of the absorbent material, as will be understood by a person having ordinary skill from the description herein.

Each of the sheets 10-24 is preferably made of a two layer laminate material. The laminate is made of a first layer of a rigidifying material, including, without limitation, aluminum, plastic or other rigid material, and a second layer made of an absorbent material, such as paper. "Absorbent" is defined herein as having sufficient ability to be wetted on its surface by contact with water or liquid of a similar viscosity, surface tension, etc. The layers of each of the sheets 10-24 are first laminated together, as described in more detail below, and then each sheet is slit and expanded in a conventional manner. Subsequently, each sheet is bonded to a next adjacent sheet to form the pad 8.

The absorbent paper and the rigidifying layer are laminated together in a conventional manner using adhesives. For example, a roll of thin aluminum and a roll of paper are placed with their axes of rotation parallel to one another and spaced apart. A thin layer of adhesive is applied by rollers or spray to the facing surfaces of each layer, and then the layers are squeezed together between large cylindrical rolls, known as a calender, that have axes parallel to, and spaced from, each other. Alternatively, an adhesive film is placed between the layers and then the assembly is forced through a hot calender, as is known for laminating paper layers together. The temperature, pressure, speed of the rollers and other parameters of this method will be apparent to a person of ordinary skill from the description herein and the particular glue or film selected by such person.

Once formed, the laminated sheet made of paper and foil is subsequently slit and expanded on a conventional machine using known processes for slitting and expanding paper and other thin films. Such machines can be used to make all slits in a particular sheet the same size and spacing as the slits in all other sheets. Alternatively, the sheets can have slits that vary in size and/or spacing, as is know in the field of expanding paper and other thin films.

Once the laminated sheets are slit and expanded, they are bonded to other similar sheets to form the pad shown in FIG. 1. The bonding of one sheet to another is also performed using a conventional procedure, such as adhesives, stitching, etc. In a typical embodiment, as shown in FIGS. 2 and 3, two sheets 12 and 14 are bonded to one another with adhesive only at the contact points of the sheets. It is preferred that the openings in each sheet are offset from the openings in each next adjacent sheet, as shown, to provide for substantially tortuous paths through the pad 8.

As shown in FIG. 3, a paper layer 30 of the sheet 14 faces the opposite direction as the aluminum layer 32. The sheet 12 has a paper layer 40 facing the opposite direction as the aluminum layer 42, and the paper layer of the sheet 12 faces the same direction as the paper layer of the sheet 14. Of course, the paper layer of the sheet 12 can face the opposite direction as the paper layer of the sheet 14, and any combination or pattern of directions of the paper layer is contemplated.

The pad 8 is rigid, exhibits very good performance, and is generally less expensive to manufacture than prior art pads. The absorbent layer of each sheet 10-24 distributes water evenly over a large surface area to promote evaporation of water into the air stream that is forced through the openings in the slit and expanded sheets 10-24. The rigid layers of each of the sheets 10-24 provide mechanical strength and rigidity to the pad, while the absorbent layers provide water distribution. The absorbent properties of a pad made according to the invention can be modified by modifying the type of paper that is laminated to the rigidifying layer. For example, a pad made according to the present invention can be made to wick up from a pool of water by using wicking paper in combination with the rigidifying aluminum layer. Likewise, different absorbency characteristics can be obtained using different absorbing materials. Each sheet in a pad can have different characteristics from the other sheets, or all sheets can be the same. Of course, there are many combinations that cannot be listed exhaustively herein.

It is preferred that the aluminum layer 32 has a thickness of less than about 0.005 inches. An exemplary thickness is about 0.002 inches, and the desired range is between about 0.001 inches and about 0.004 inches. The thickness of the paper is in the range of 0.005 inches to about 0.030 inches. The preferred paper thickness is between about 0.010 inches and about 0.020 inches.

Although aluminum is the preferred rigidifying material, it is contemplated to use plastic as an alternative. The rigidifying layers contemplated are non-absorbent, but this is not required. Furthermore, most plastic has "memory", meaning that after it has been expanded and the tensile force that causes expansion released, the plastic rebounds to or near its original position. Therefore, additional processing of a plastic rigidifying layer, such as by heating during expansion and cooling before release of the expanding forces, will be necessary with conventional polymers.

A sample of the present invention was manufactured using 1000 series aluminum foil with a thickness of 0.002 inches laminated to a bleached Kraft paper using adhesives having a thickness of 0.000125 inches thick. The same foil was used to laminate aluminum foil to a standard wicking paper. The laminated paper and aluminum foil were then slit and expanded, and then evaporative pads were made of 15-20 expanded layers glued together with film adhesives.

Figure 4:
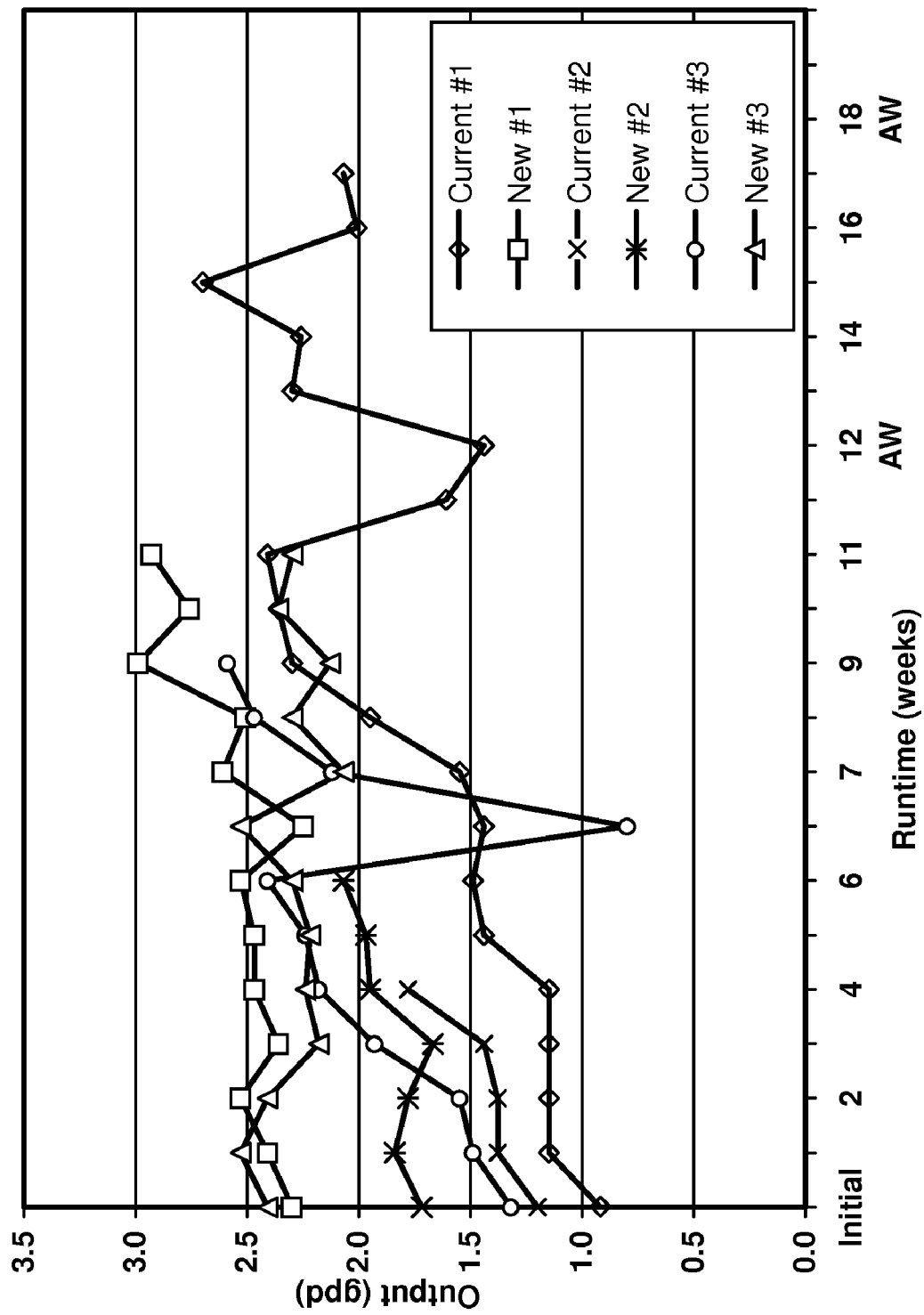
FIG. 4 is a graphical representation of data obtained by testing the present invention and conventional (designated "current") pads.

The first configuration was evaluated against a conventional coated evaporative pad, which is designated "current" in the table of FIG. 4. Evaporative pads were then tested for several weeks to evaluate the initial performance and the impact of a mineral deposit on the output of test humidifiers. Portable humidifiers were used for this evaluation.

The performance of the subject pads is presented in FIG. 4 as humidifier output in gallons of water per day. FIG. 4 shows test results for three units with conventional (current) coated evaporative pads and 3 units with evaporative pads made according to the present invention. The initial performance (output) of the design incorporating the invention is significantly higher than the performance of the coated pads, as noted by the fact that the top three sets of results result from the pads made according to the invention. Differences between tested humidifiers and differences between evaporative pads caused a spread of the data that can be ignored. Therefore, it can reasonably be concluded that the evaporative pads made according to the invention exhibit higher performance than the conventional coated pads.

There are many alternatives that will become apparent to a person having ordinary skill. For example, some or all of the laminated sheets 10-24 can be replaced by three layer sheets (not shown) in which a layer of a rigidifying material, such as aluminum, has absorbent layers, such as paper, bonded to both sides. Still further, the paper, although absorbent, need not be of the wicking type. Wicking paper has a relatively high capillary rise. Capillary rise is a measure of the rate of absorption of water and is referred to as Klemm in the paper industry. Typically, it measures the rate of travel or rise of water in paper having a portion of the sheet disposed in contact with a liquid, such as water. A preferred wicking paper has a Klemm value of $^{45}/_{16}$ inch to $^{79}/_{16}$ inch per minute. Any paper with a Klemm value between about $^{1}/_{16}$ inch to $^{16}/_{16}$ inch per minute will suffice as a substantially non-wicking paper for purposes of the present invention, and any Klemm value higher than $^{16}/_{16}$ inch per minute is considered wicking. A nonwicking paper sheet or layer need only be sufficiently absorbent to permit the sheet to be readily wetted through contact with the wetted wicking paper sheet.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An improved evaporative element for a humidifier made up of a plurality of stacked, slit and expanded sheets, each of the sheets being attached to at least one next adjacent sheet, the improvement comprising each of said sheets being a laminated composite sheet made of a rigidifying layer laminated to an absorbent layer before the layers are slit and expanded, wherein contours of the slit and expanded rigidifying layer of each composite sheet matingly nest with contours of the slit and expanded absorbent layer of the same composite sheet.

2. The improved evaporative element in accordance with claim 1, wherein the rigidifying layer is plastic.

3. The improved evaporative element in accordance with claim 1, wherein the rigidifying layer is aluminum.

4. The improved evaporative element in accordance with claim 3, wherein the absorbent layer is paper.

5. The improved evaporative element in accordance with claim 4, wherein the rigidifying layer has a thickness in a range greater than about 0.001 inches and less than about 0.005 inches.

6. The improved evaporative element in accordance with claim 1, each composite sheet further comprising a second absorbent layer laminated to an opposite side of the rigidifying layer relative to the other absorbent layer before the layers are slit and expanded, wherein the contours of the slit and expanded rigidifying layer of each composite sheet matingly nest with contours of the second slit and expanded absorbent layer of the same composite sheet.

* * * * *